(12) United States Patent
Shedden et al.

(10) Patent No.: US 12,054,960 B2
(45) Date of Patent: Aug. 6, 2024

(54) POST SUPPORT AND RELATED METHODS

(71) Applicant: TOPAZ TRADING PTY LTD, Tasmania (AU)

(72) Inventors: Timothy Shedden, Tasmania (AU); Jamie Shedden, Tasmania (AU); Jason Shedden, Tasmania (AU)

(73) Assignee: TOPAZ TRADING PTY LTD, Brighton TAS (AU)

( * ) Notice: Subject to any disclaimer, the term of this patent is extended or adjusted under 35 U.S.C. 154(b) by 186 days.

(21) Appl. No.: 17/624,988

(22) PCT Filed: Jul. 3, 2020

(86) PCT No.: PCT/AU2020/050698
§ 371 (c)(1),
(2) Date: Jan. 5, 2022

(87) PCT Pub. No.: WO2021/003524
PCT Pub. Date: Jan. 14, 2021

(65) Prior Publication Data
US 2022/0259884 A1    Aug. 18, 2022

(30) Foreign Application Priority Data
Jul. 5, 2019 (AU) ................................ 2019902393

(51) Int. Cl.
*E04H 12/22* (2006.01)
*F16B 9/02* (2006.01)
*F16B 41/00* (2006.01)

(52) U.S. Cl.
CPC .......... *E04H 12/2253* (2013.01); *F16B 9/02* (2013.01); *F16B 41/005* (2013.01)

(58) Field of Classification Search
CPC ....... E04H 12/2253; F16B 9/02; F16B 41/005
See application file for complete search history.

(56) References Cited

U.S. PATENT DOCUMENTS

| 207,871 A | 9/1878 | Horton et al. |
| 375,350 A | 12/1887 | Glover |
| (Continued) | | |

FOREIGN PATENT DOCUMENTS

| DE | 202006008339 | 10/2006 |
| KR | 20-2009-0007770 | 7/2009 |
| (Continued) | | |

OTHER PUBLICATIONS

U.S. Appl. No. 17/609,499, filed Nov. 8, 2021.
(Continued)

*Primary Examiner* — Monica E Millner
(74) *Attorney, Agent, or Firm* — Sheridan Ross P.C.

(57) ABSTRACT

A post support having a base securable to a surface and a cap for concealing fasteners used for securing the base to the surface, wherein: the base has two upstanding portions with a central base portion therebetween, the cap has a central support portion between two downwardly extending portions, the cap being receivable within the base and rotatable between a first condition of use in which the said fasteners are accessible and a second condition of use in which the fasteners are concealed, and at least one protuberance is provided, the protuberance being associated with the upstanding portions and the downwardly extending portions for retaining the cap within the base.

10 Claims, 8 Drawing Sheets

(56) References Cited

U.S. PATENT DOCUMENTS

| | | | |
|---|---|---|---|
| 1,966,044 A | 7/1934 | Place et al. | |
| 2,136,523 A | 11/1938 | Heyman | |
| 2,283,494 A | 5/1942 | Erdman | |
| 2,511,051 A | 6/1950 | Dzus | |
| 2,722,259 A | 11/1955 | Eckenbeck et al. | |
| 2,751,806 A | 6/1956 | Roberto | |
| 2,752,814 A | 7/1956 | Iaia | |
| 2,892,650 A | 6/1959 | Runton | |
| 2,982,166 A | 5/1961 | Hobbs | |
| 3,175,454 A | 3/1965 | Milton | |
| 3,252,495 A | 5/1966 | Waltermire | |
| 3,299,766 A | 1/1967 | Gould et al. | |
| 3,370,631 A | 2/1968 | James | |
| 3,414,304 A | 12/1968 | Miller | |
| 3,459,447 A | 8/1969 | Hurd et al. | |
| 3,462,114 A | 8/1969 | O'Dell et al. | |
| 4,033,243 A | 7/1977 | Kirrish et al. | |
| 4,199,908 A * | 4/1980 | Teeters | E04H 12/2284 52/295 |
| 4,310,273 A | 1/1982 | Kirrish | |
| 4,490,083 A | 12/1984 | Rebish | |
| 4,609,317 A | 9/1986 | Dixon et al. | |
| 4,924,648 A * | 5/1990 | Gilb | E04H 12/2253 52/297 |
| 5,165,882 A | 11/1992 | Shimizu et al. | |
| 5,290,131 A | 3/1994 | Henriksen | |
| 5,375,384 A * | 12/1994 | Wolfson | E04B 1/0007 52/297 |
| 5,421,356 A | 6/1995 | Lynch | |
| 5,454,676 A | 10/1995 | Conte | |
| 5,477,929 A | 12/1995 | Kenyon et al. | |
| 5,597,161 A | 1/1997 | Bellehumeur et al. | |
| 5,707,373 A | 1/1998 | Sevrain et al. | |
| 6,012,763 A | 1/2000 | Clemente et al. | |
| 6,039,243 A | 3/2000 | Lickton | |
| 6,041,823 A | 3/2000 | Kusama | |
| 6,258,091 B1 | 7/2001 | Sevrain et al. | |
| 6,270,500 B1 | 8/2001 | Lerch | |
| 6,379,363 B1 | 4/2002 | Herrington et al. | |
| 6,460,308 B1 | 10/2002 | Armstrong et al. | |
| 6,513,290 B2 * | 2/2003 | Leek | E04B 1/2604 52/297 |
| 6,514,005 B2 | 2/2003 | Shiokawa et al. | |
| 6,648,518 B2 | 11/2003 | Uchman | |
| 6,685,707 B2 | 2/2004 | Roman et al. | |
| 6,854,921 B2 | 2/2005 | Melberg et al. | |
| 7,329,077 B2 | 2/2008 | Curtis | |
| D592,097 S | 5/2009 | Androuais | |
| 7,563,063 B1 | 7/2009 | Madej | |
| 7,850,148 B2 * | 12/2010 | Collins, IV | E04H 17/21 248/156 |
| 7,988,397 B2 | 8/2011 | Bodin et al. | |
| 8,210,785 B1 | 7/2012 | Gager | |
| 8,544,196 B2 | 10/2013 | Leo | |
| 8,622,364 B2 | 1/2014 | Bergman | |
| 8,959,857 B1 * | 2/2015 | Lin | E04H 12/2261 52/297 |
| 9,033,631 B2 | 5/2015 | Greenberg et al. | |
| 9,200,590 B2 | 12/2015 | Griffiths | |
| 9,333,825 B2 | 5/2016 | Stockard | |
| 9,347,196 B2 * | 5/2016 | Wagler | E02D 27/42 |
| 9,353,778 B2 | 5/2016 | Chalverat | |
| 9,366,278 B2 | 6/2016 | Ishida | |
| 9,371,738 B2 | 6/2016 | Harris | |
| 9,377,046 B1 | 6/2016 | Lackey et al. | |
| 9,610,490 B2 | 4/2017 | Tambornino et al. | |
| 9,758,350 B2 | 9/2017 | Frisch | |
| 9,759,510 B1 | 9/2017 | Kempf et al. | |
| 9,851,048 B2 | 12/2017 | Higgins | |
| 9,861,163 B2 | 1/2018 | Leo | |
| 9,909,634 B2 | 3/2018 | Brandl et al. | |
| 9,938,745 B1 * | 4/2018 | Fox | E04H 12/2292 |
| 9,943,137 B2 | 4/2018 | Leo | |
| 9,976,591 B2 | 5/2018 | Lambert et al. | |
| 10,071,766 B2 | 9/2018 | Chapple et al. | |
| 10,130,110 B2 | 11/2018 | Klimke et al. | |
| 10,143,269 B2 | 12/2018 | Leo | |
| 10,166,015 B2 | 1/2019 | Klein et al. | |
| 10,330,347 B2 | 6/2019 | Yang | |
| 10,392,228 B2 | 8/2019 | Miller et al. | |
| 10,392,234 B2 | 8/2019 | Bryan et al. | |
| 10,677,566 B2 | 6/2020 | Dantzer et al. | |
| D897,830 S | 10/2020 | Roberto | |
| D898,559 S | 10/2020 | Hill | |
| D905,547 S | 12/2020 | Campion | |
| 10,907,680 B2 | 2/2021 | Hill | |
| 10,920,813 B2 | 2/2021 | Perroud et al. | |
| 10,954,989 B2 | 3/2021 | Lucas | |
| 11,028,969 B2 | 6/2021 | Weathers et al. | |
| 11,649,951 B1 | 5/2023 | Kennemer et al. | |
| 2012/0006964 A1 * | 1/2012 | Bergman | E04H 12/2261 248/523 |
| 2016/0069375 A1 | 3/2016 | Henricksen, Jr. | |
| 2017/0016243 A1 * | 1/2017 | Testa | E04H 12/2253 |

FOREIGN PATENT DOCUMENTS

| | | |
|---|---|---|
| WO | WO 2006/122894 | 11/2006 |
| WO | WO 2018/092938 | 5/2018 |
| WO | WO 2020/227769 | 11/2020 |

OTHER PUBLICATIONS

International Search Report and Written Opinion for International (PCT) Patent Application No. PCT/AU2020/050470, dated Jul. 6, 2020, 15 pages.

International Search Report and Written Opinion for International (PCT) Patent Application No. PCT/AU2020/050698, dated Oct. 9, 2020, 10 pages.

Official Action for U.S. Appl. No. 17/609,499, dated Oct. 6, 2023 15 pages.

Extended Search Report for European Patent Application No. 20835989.3, dated May 25, 2023, 5 pages.

Notice of Allowance for U.S. Appl. No. 17/609,499, dated Mar. 6, 2024 7 pages.

* cited by examiner

POST SUPPORT AND RELATED METHODS

CROSS REFERENCE TO RELATED APPLICATIONS

This application is a national stage application under 35 U.S.C. § 371 and claims the benefit of PCT Application No. PCT/AU2020/050698 having an international filing date of 3 Jul. 2020, which designated the United States, which PCT application claimed the benefit of Australia Patent Application No. 2019902393 filed 5 Jul. 2019, the disclosures of each of which are incorporated herein by reference in their entireties.

FIELD OF THE INVENTION

The present invention relates to a post support, a method of forming a post support and a method of securing a post to a mounting surface.

BACKGROUND

Post supports are a cost-effective way of securing a generally vertical post to a surface such as concrete. When it is not possible to set the post support into the surface when forming the surface, the post support is required to be fixed thereto with fasteners. This results in part of the fasteners being exposed, which need to be accommodated within the support and which can be visually unappealing.

It has previously been proposed to provide a two-part post support having a base or saddle with a cap received therein, the cap providing an offset base on which the post can be received to conceal the fasteners from view. However, such an arrangement does not provide access to the fasteners for adjustment, requiring a separate cap to be provided if adjustment of the fasteners is required.

There is a need to address the above, and/or at least provide a useful alternative.

SUMMARY

According to one aspect of the invention there is provided a post support having a base securable to a surface and a cap for concealing fasteners used for securing the base to the surface, wherein:

the base has two upstanding portions with a central base portion therebetween, the cap has a central support portion between two downwardly extending portions, the cap being receivable within the base and rotatable between a first condition of use in which the said fasteners are accessible and a second condition of use in which the fasteners are concealed, and at least one protuberance is provided, the protuberance being associated with the upstanding portions and the downwardly extending portions for retaining the cap within the base.

According to preferred embodiments of the invention, the tabs are formed on the upstanding portions of the base and extend inwardly to engage the downwardly extending portions of the cap. Preferably, the base is formed from a sheet of material, with the tabs being folded inwardly.

Preferably, the central base portion is formed with a central aperture through which the said fasteners can be received. The central aperture may be larger than the fastener to allow the position of the post support to be adjusted as required.

Preferably, the post support further includes a washer having an outer diameter larger than the aperture in the base portion.

According to another aspect of the invention, there is provided a post support of the above described type and a threaded fastener pair, the threaded fastener pair including:
a first threaded fastener with a male threaded portion; and
a second threaded fastener with a female threaded portion, the female portion being configured to receive the male threaded portion,
wherein the first threaded fastener is formed with a shank having an outer diameter approximately equal to an outer diameter of the second threaded portion, the second threaded fastener has a length equal to or greater than that of the first threaded fastener and at a base of the female threaded portion is an unthreaded bore.

According to another aspect of the invention, there is provided a method of forming a post support, including the steps of:
forming a base from a sheet of material, the base having two upstanding portions with a central base portion therebetween,
forming a cap from a sheet of material, the cap having a central support portion between two downwardly extending portions, the cap being receivable within the base and rotatable between a first condition of use in which fasteners securing the post support to a surface are accessible and a second condition of use in which the fasteners are concealed, and
forming at least one protuberance on the cap or the base, the at least one protuberance being associated with the upstanding portions and the downwardly extending portions for retaining the cap within the base.

According to preferred embodiments, the at least one protuberance is a pair of inwardly extending tabs formed on the upstanding portions on either side of the base According to another aspect of the invention, there is provided a method of installing a post on a post support, including the steps of:
providing a post support of the above described type;
securing the post support to a surface;
installing the cap in the desired orientation; and
securing a post to the post support.

BRIEF DESCRIPTION OF THE DRAWINGS

In order that the invention may be more easily understood, an embodiment will now be described, by way of example only, with reference to the accompanying drawings, in which.

DETAILED DESCRIPTION

Figure 1:
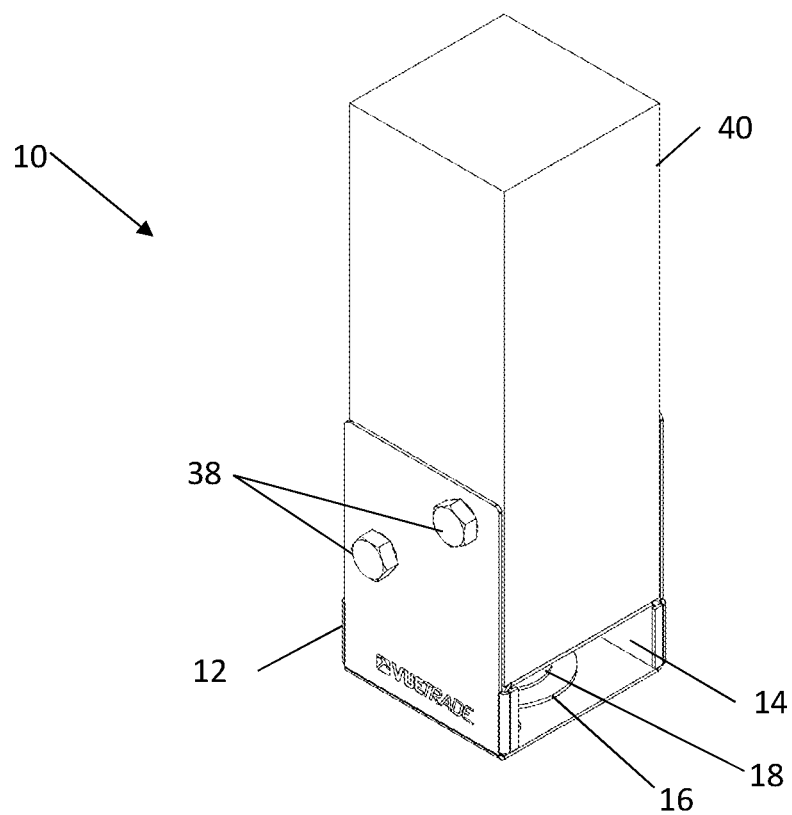
FIG. 1 is a perspective view of a post support according to a preferred embodiment of the invention
Figure 2:
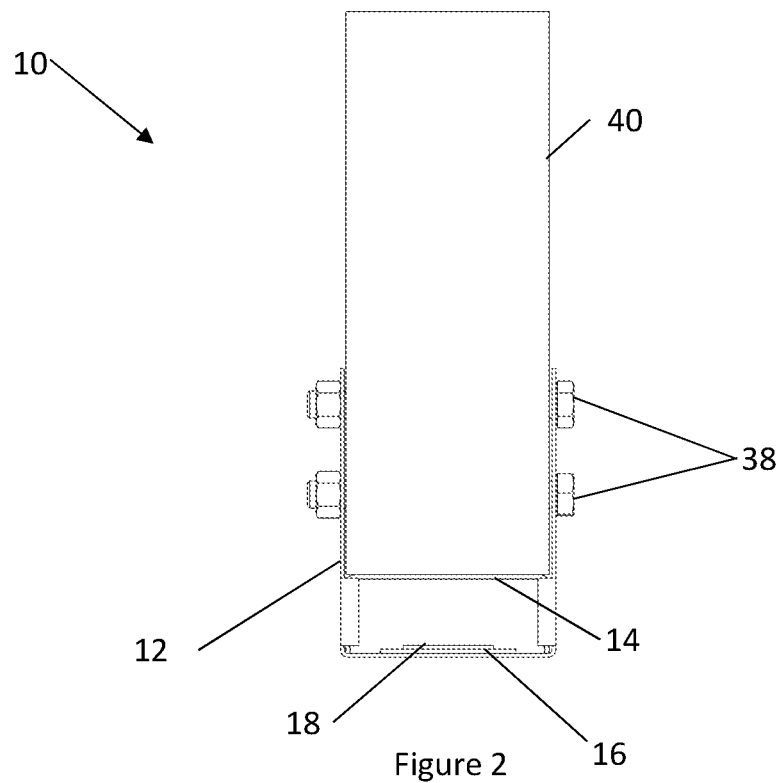
FIG. 2 is a side view of the post support.
Figure 3:
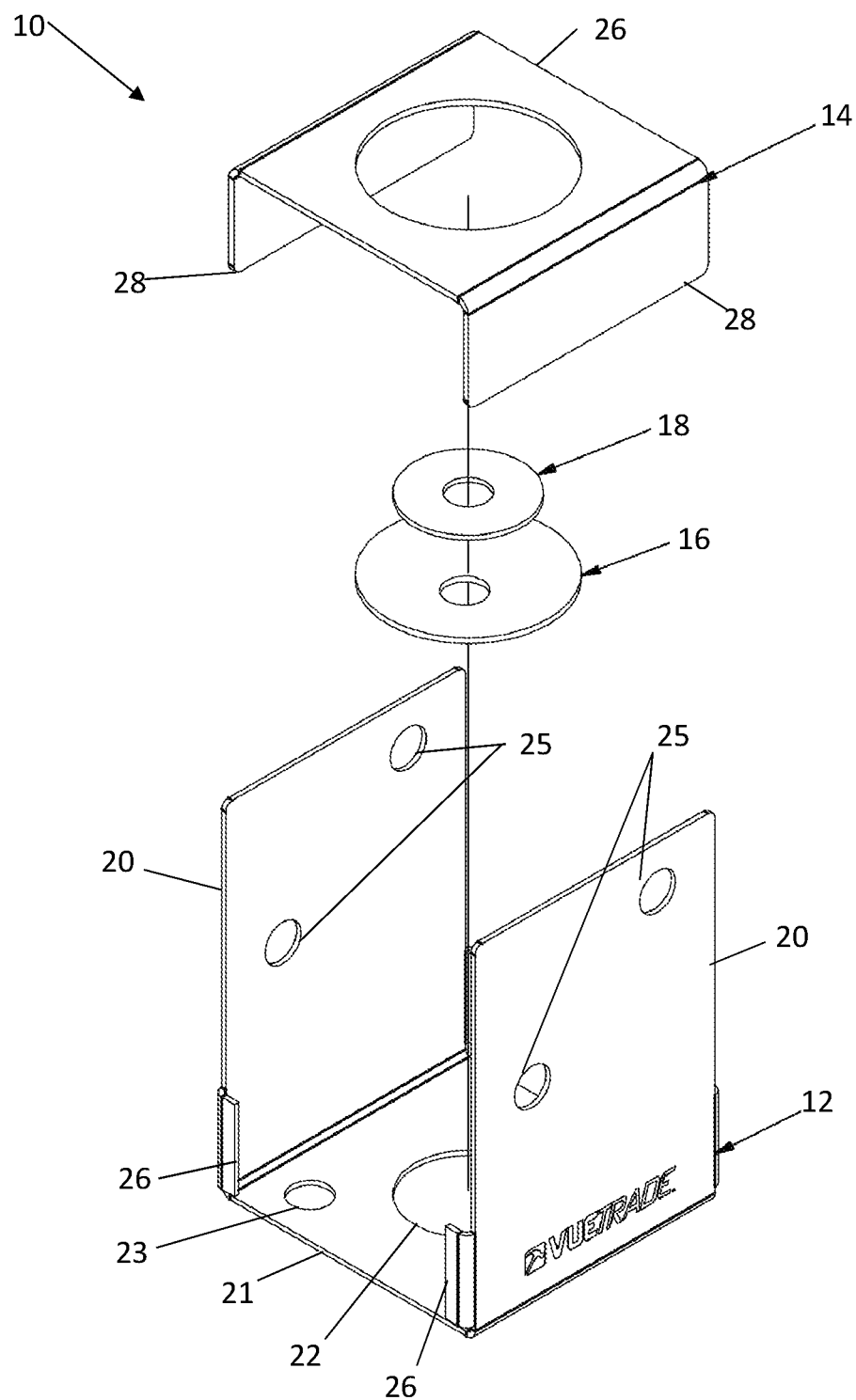
FIG. 3 is an exploded perspective view of the post support.
Figure 4:
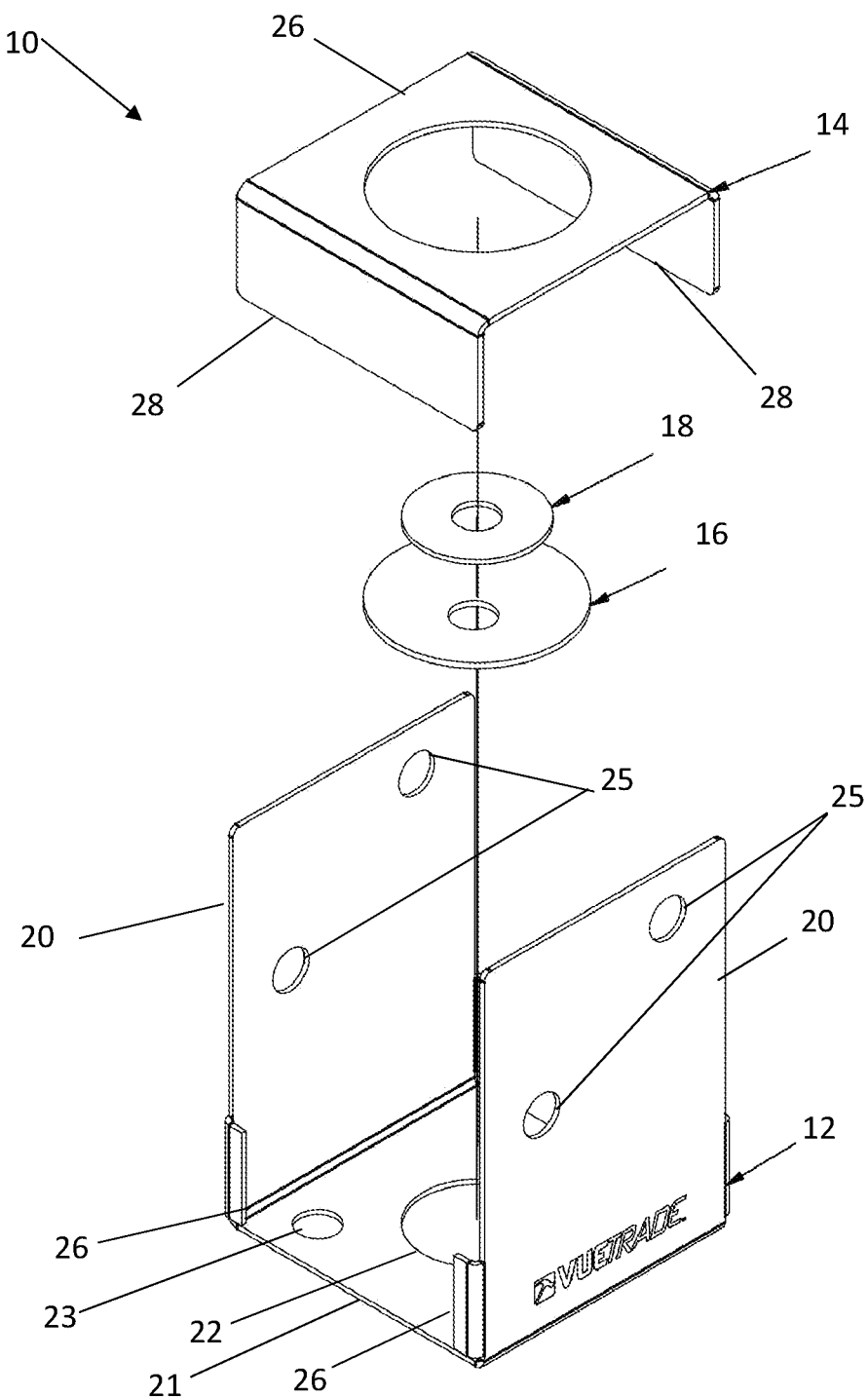
FIG. 4 is an exploded perspective view of the post support in another condition of use.
Figure 5:
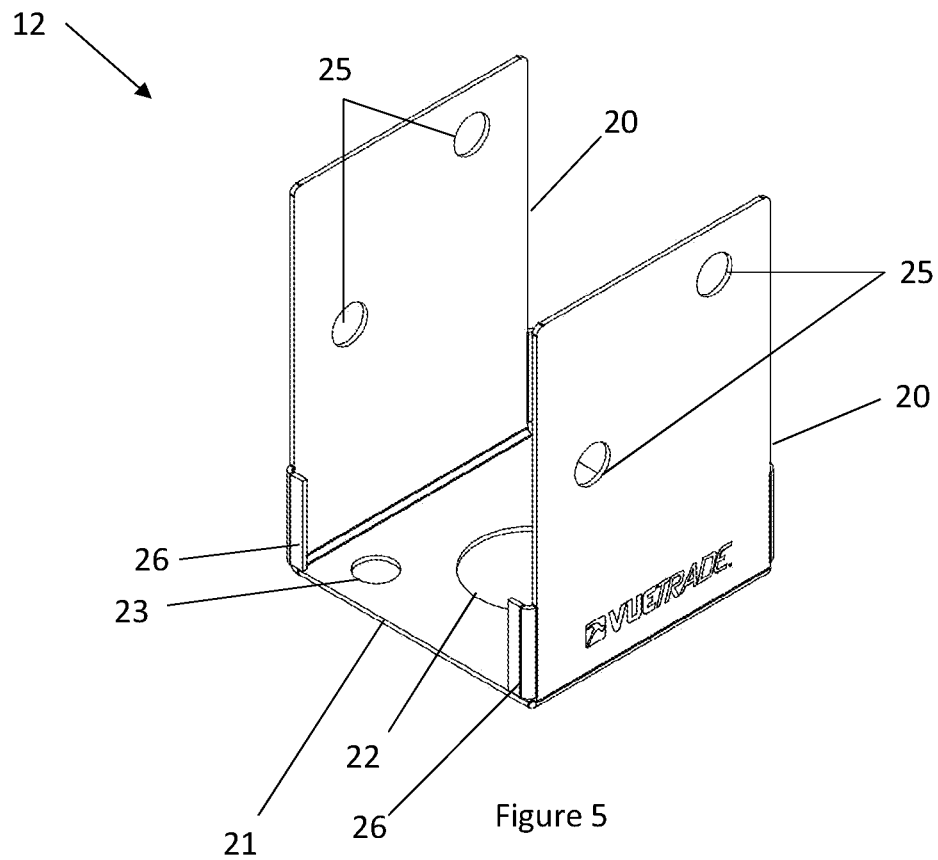
FIG. 5 is a perspective view of a base of the post support.
Figure 6:
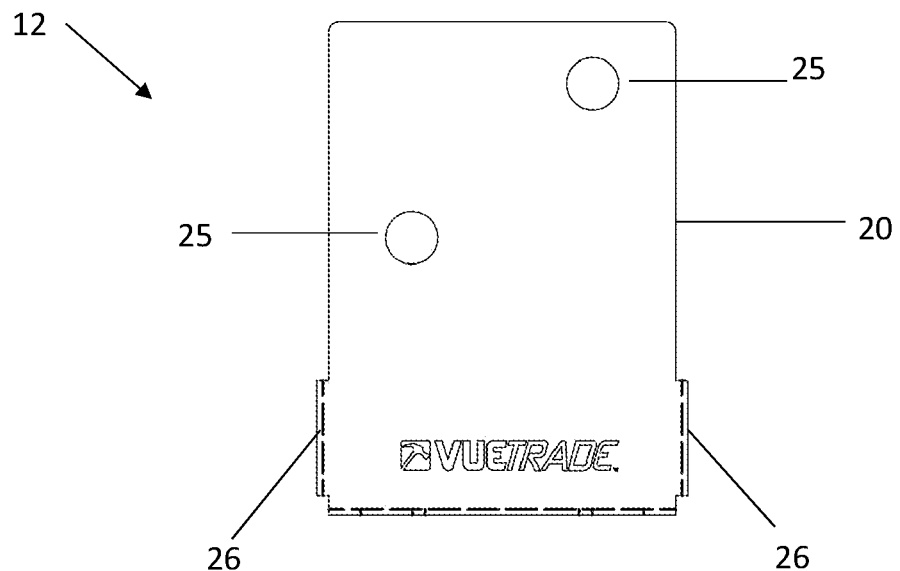
FIGS. 6, 7 and 8 are respective first side, plan and second side views of the base.

A post support 10 according to a preferred embodiment of the invention is shown in FIG. 1. The post support 10 is configured for securing a post to a ground surface.

The post support 10 has a base 12 securable to a surface and a cap 14 for concealing fasteners used for securing the base 12 to the surface. A large washer 16 is used to allow for adjustment in the position of the post support 10 so that dimensional variances in the position of the post can be accommodated. A small washer 18 is provided along with the large washer 16 to increase the effective thickness of the washer 16 and improve uplift or pull-out resistance of the post support.

The base 12 has two upstanding portions 20 with a central base portion 21. The central base portion 21 is receivable against the surface and has a central aperture 22 through which at least one fastener may be received. Aperture 22 is larger than an external diameter of the fastener to allow for adjustment of the position of the post support 10, as will be described in further detail below.

Alternatively, apertures 23 may be used to secure the post support 10 to the surface.

Figure 17:
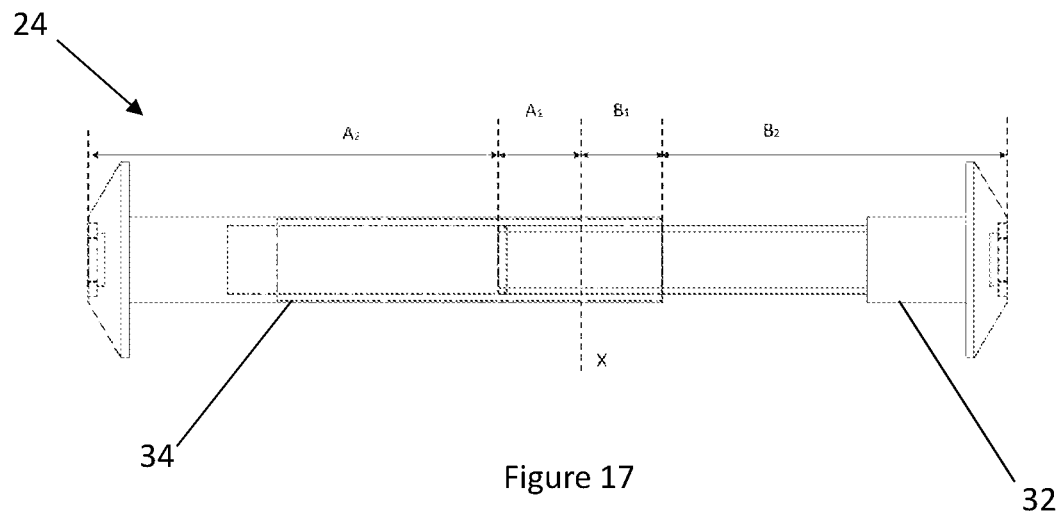
FIGS. 17 to 19 are perspective views of a threaded fastener pair for use with the post support.
Figure 18:
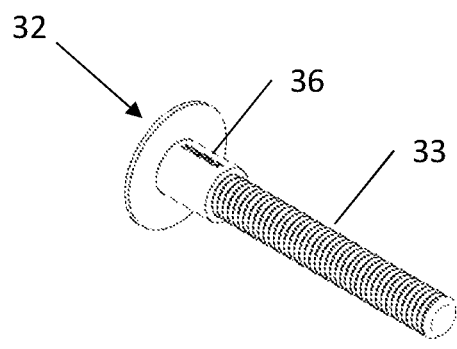
Figure 19:
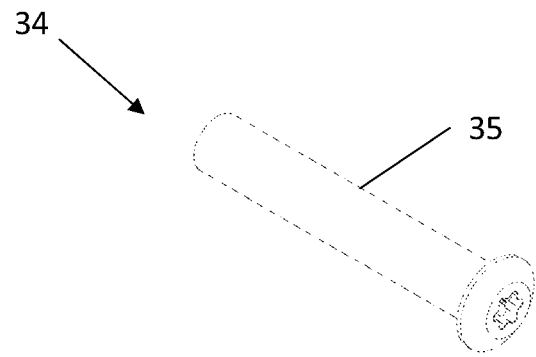

The two upstanding portions 20 are configured to extend on either side of the post to allow the post to be secured to the post support 10. This may be achieved via the traditional method of using bolts 38 that extend through apertures 25, though a threaded fastener pair 24 as illustrated in FIGS. 17 to 19 may also be used.

The threaded fastener pair 24 includes a first fastener 32 with a male threaded portion 33, and a second fastener 34 with a female threaded portion 35. The female threaded portion 35 is configured to receive the male threaded portion 33.

In the illustrated embodiment, the fasteners are of equal length and length A2 equals length B2. Also, length A1 equals length B1, with B1 being the length of which fastener 34 extends past the midpoint or centreline x between the heads of each fastener.

The first fastener 32 is formed with a shank 36 having an outer diameter approximately equal to an outer diameter of the second fastener 34. In a preferred form, the shank 36 of the first threaded fastener 12 is at least 10 mm long and has a diameter of at least 10 mm.

In preferred embodiments, the second threaded fastener 34 has a length equal to or greater than that of the first threaded fastener 32 and the length of the first threaded fastener 32 is at least 50 mm. In preferred forms, the first threaded fastener 32 is available in lengths of 50 mm, 70 mm and 110 mm, though it will be appreciated that longer lengths may also be possible.

By providing a first threaded fastener 32 with a shank 36 having an outer diameter that is approximately equal to an outer diameter of the second fastener 34, and the fasteners 32, 34 being of equal length, an inner bore of a through hole formed in the post is well supported on the fastener pair with the shank 36 and outer diameter of the second fastener contacting the upstanding sides 20. Advantageously, a neat connection without exposed ends of threads is provided, without compromising the strength of the connection between the fastener pair 24 and the post support 10.

Threaded fastener pair 24 is further described in Australian provisional patent application no. 2019901647, also to the present applicant, and the entire contents of which are incorporated herein for reference.

The cap 14 has a central support portion 26 for supporting an end of a post. The central support portion 26 is disposed between two downwardly extending portions 28, that are provided to offset the central support portion 26 from the base 12.

Large washer 16 is formed from the cap 14 from a punching process, resulting in a central aperture 30 being formed in the cap 14.

As can be seen in FIGS. 1 to 4, the cap 14 is receivable within the base 12 and rotatable between a first condition of use (FIG. 3) in which the said fasteners are accessible and a second condition of use (FIG. 4) in which the fasteners are concealed. The method of securing the support 10 to a surface will be described in further detail below.

To keep the cap 14 retained within the base, at least one protuberance is provided, the protuberance being associated with the upstanding portions 20 and the downwardly extending portions 28 for retaining the cap 14 within the base 12.

It will be appreciated that the protuberance may take different forms and may extend from either the upstanding portions 20 or the downwardly extending portions 28.

Figure 7:
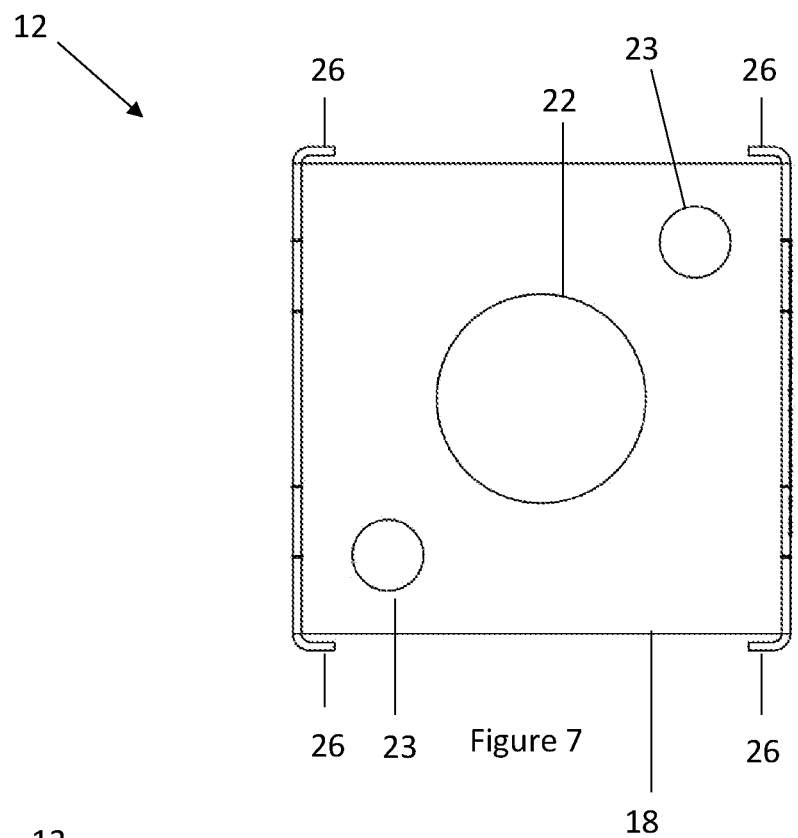
Figure 8:
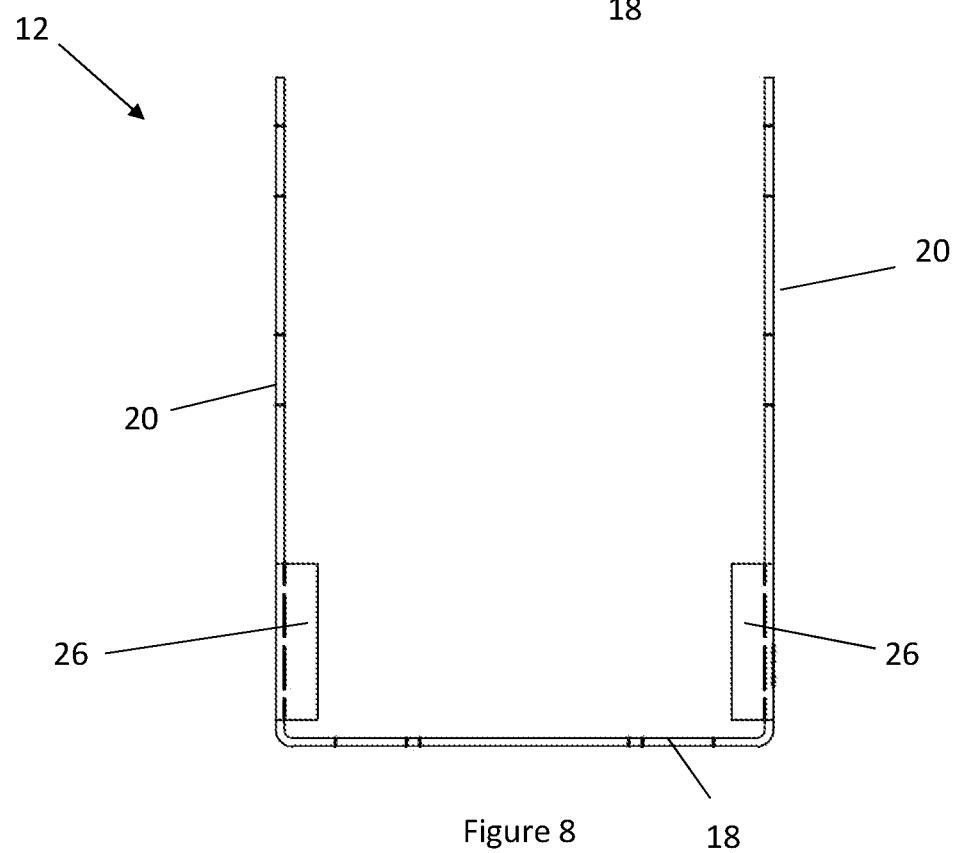
Figure 9:
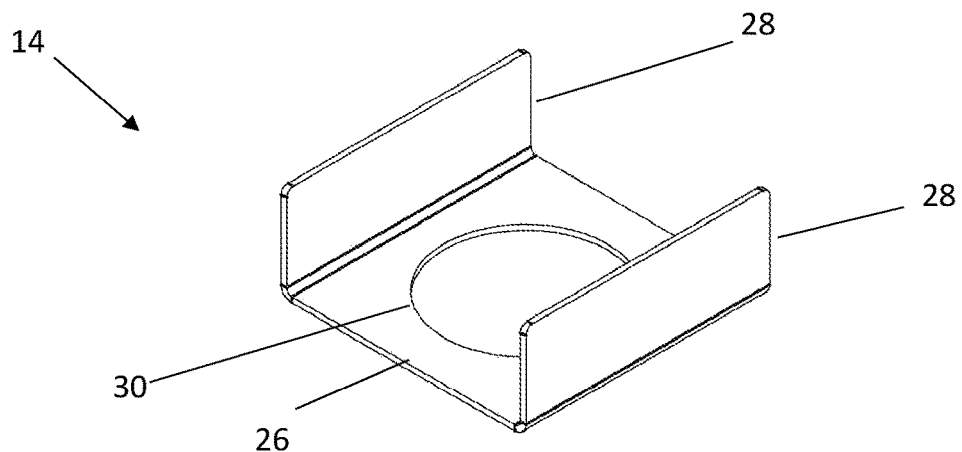
FIG. 9 is a perspective view of a cap of the post support.
Figure 10:
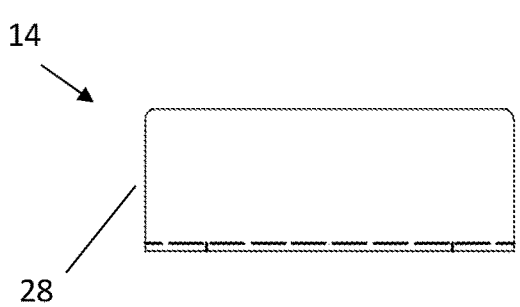
FIGS. 10 to 12 are respective first side, second side and plan view of the cap.
Figure 11:
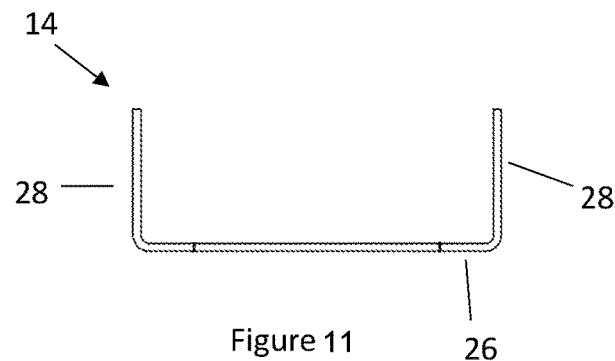
Figure 12:
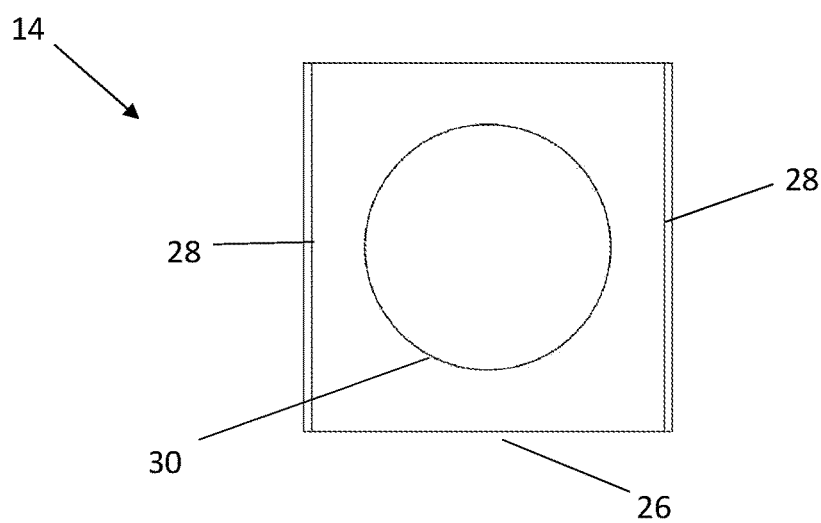

In the illustrated embodiments, the protuberance is a pair of tabs 26 formed on the upstanding portions 20 and extending inwardly to engage the downwardly extending portions 28 of the cap 14. As can be seen in FIG. 7, two tabs 26 are provided on either side of the post support 10 (four total) to prevent sideways movement on the cap 14 in the base 12.

Advantageously, a single post support 10 may be provided which is adaptable between a first condition of use (FIG. 3) where fasteners used to secure the post support 10 to the surface are accessible for adjustment after installation, and a second condition of use (FIG. 4) where the fasteners are hidden, thereby providing a cleaner, finished look.

Figure 13:
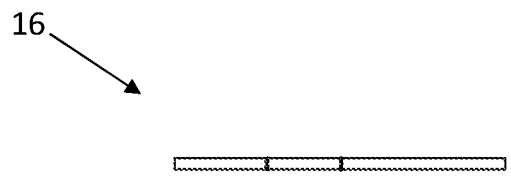
FIGS. 13 and 14 are side and plan views of a large washer for use with the post support.
Figure 14:
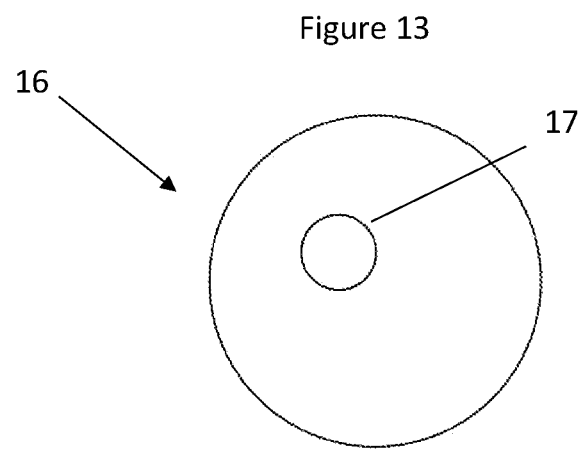

FIGS. 13 and 14 illustrate large washer 16, which preferably has an outer diameter which is larger than aperture 22 in the base portion 21. Although shown with washer 16 having an aperture 17 formed therein at a location which is offset from a centre of the washer 16, which would allow that when a fastener is received through the aperture 17 in the washer 16 at least a portion of the washer 16 will always overlap the base portion 21 to ensure retention, in other embodiments the aperture 17 may be centrally disposed. The use of washer 16 allows for adjustment in the position of the post support 10 to accommodate a varying location of a post.

Figure 15:
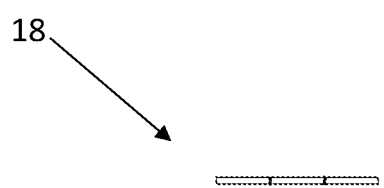
FIGS. 15 and 16 are side and plan views of a small washer for use with the post support.
Figure 16:
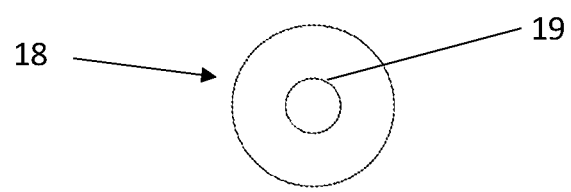

Small washer 18, as illustrated in FIGS. 15 and 16, is provided to increase the effective thickness of the washer 16 to increase pull out strength.

Base 12 and cap 14 of the post support 10 may be formed of galvanised steel, though may be formed of other materials. In some embodiments, the base and cap are formed from a sheet of material, with the tabs being folded inwardly.

In installing the post support 10, the base 12 may first be positioned on the surface and a position of securing fasteners located. Once the fasteners have been installed, the base 12 is then secured to the surface and cap 14 installed in the desired position, which may be the first condition of use shown in FIG. 3 where access to the securing fasteners is provided, or the second condition of use of FIG. 4, where the securing fasteners are hidden. A post (40) may then be installed and secured to the post support 10, as shown in FIG. 1.

Throughout this specification and the claims which follow, unless the context requires otherwise, the word "comprise", and variations such as "comprises" and "comprising", will be understood to imply the inclusion of a stated integer or step or group of integers or steps but not the exclusion of any other integer or step or group of integers or steps.

The reference in this specification to any prior publication (or information derived from it), or to any matter which is known, is not, and should not be taken as an acknowledgment or admission or any form of suggestion that that prior publication (or information derived from it) or known matter forms part of the common general knowledge in the field of endeavour to which this specification relates.

What is claimed is:

1. A post support having a base securable to a surface and a cap for concealing fasteners used for securing the base to the surface, wherein:
   the base has two upstanding portions with a central base portion therebetween,
   the cap has a central support portion between two downwardly extending portions, the cap being receivable within the base and rotatable between a first condition of use in which the fasteners are accessible and a second condition of use in which the fasteners are concealed, and
   at least one protuberance is provided, the protuberance being associated with the upstanding portions and the downwardly extending portions for retaining the cap within the base.

2. The post support according to claim 1, wherein the at least one protuberance comprises tabs formed on the upstanding portions of the base, and wherein the tabs extend inwardly to engage the downwardly extending portions of the cap.

3. The post support according to claim 2, wherein the base is formed from a sheet of material, with the tabs being folded inwardly.

4. The post support according to claim 1, wherein the central base portion is formed with a central aperture to receive the fasteners.

5. The post support according to claim 4, wherein the central aperture is larger than the fasteners to allow a position of the post support to be adjusted as required.

6. The post support according to claim 5, wherein the post support further includes a washer having an outer diameter larger than the central aperture in the central base portion so that at least a portion of the washer overlaps the central base portion.

7. A post support system including a post support according to claim 1 and a threaded fastener pair, the threaded fastener pair including:
   a first threaded fastener with a male threaded portion; and
   a second threaded fastener with a female threaded portion, the female threaded portion being configured to receive the male threaded portion,
   wherein the first threaded fastener is formed with a shank having an outer diameter approximately equal to an outer diameter of the female threaded portion of the second threaded fastener, and wherein the second threaded fastener has a length equal to or greater than that of the first threaded fastener and at a base of the female threaded portion is an unthreaded bore.

8. A method of forming a post support having a base securable to a surface and a cap for concealing fasteners used for securing the base to the surface, the method comprising:
   forming the base from a sheet of material, the base having two upstanding portions with a central base portion therebetween,
   forming the cap from a sheet of material, the cap having a central support portion between two downwardly extending portions, the cap being receivable within the base and rotatable between a first condition of use in which the fasteners are accessible and a second condition of use in which the fasteners are concealed, and
   forming at least one protuberance on the cap or the base, the at least one protuberance being associated with the upstanding portions and the downwardly extending portions for retaining the cap within the base.

9. The method of forming the post support according to claim 8, wherein the at least one protuberance is a pair of inwardly extending tabs formed on the upstanding portions on either side of the base.

10. A method of installing a post on the post support according to claim 1, the method comprising:
   providing the post support;
   securing the post support to the surface;
   installing the cap in a desired orientation; and
   securing the post to the post support.

* * * * *